United States Patent
Dourra et al.

(10) Patent No.: US 7,574,906 B2
(45) Date of Patent: Aug. 18, 2009

(54) DETERMINING CLUTCH FILL VOLUME IN AN AUTOMATIC TRANSMISSION

(75) Inventors: Hussein A. Dourra, Bloomfield, MI (US); Gary J. Binienda, Clarkston, MI (US); Laszlo M. Hideg, Sterling Heights, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 255 days.

(21) Appl. No.: 11/531,291

(22) Filed: Sep. 13, 2006

(65) Prior Publication Data

US 2008/0060717 A1    Mar. 13, 2008

(51) Int. Cl.
  *G01F 17/00*    (2006.01)
(52) U.S. Cl. .......................... 73/149; 73/168
(58) Field of Classification Search ............. 73/1.35, 73/168
  See application file for complete search history.

(56) References Cited

U.S. PATENT DOCUMENTS

| | | | |
|---|---|---|---|
| 5,343,994 A | 9/1994 | Kyrtsos | |
| 5,456,647 A | 10/1995 | Holbrook | |
| 6,039,674 A | 3/2000 | Dourra et al. | |
| 6,093,133 A | 7/2000 | Danielsen et al. | |
| 6,285,942 B1 * | 9/2001 | Steinmetz et al. | 701/67 |
| 6,626,036 B2 * | 9/2003 | Milender et al. | 73/168 |
| 2003/0121748 A1 | 7/2003 | Harvey et al. | |

* cited by examiner

*Primary Examiner*—Hezron Williams
*Assistant Examiner*—Mark Shabman
(74) *Attorney, Agent, or Firm*—Ralph E. Smith (57) ABSTRACT

A method of determining a fill volume of a clutch of an automatic transmission. A clutch fill sequence is observed from measurement of fluid pressure applied to the clutch, wherein the sequence may include a initial rise, a plateau, and a final rise. A fill end time may be identified as corresponding to an intersection of a forward extrapolated portion of the plateau and a backward extrapolated portion of the final rise.

20 Claims, 4 Drawing Sheets

DETERMINING CLUTCH FILL VOLUME IN AN AUTOMATIC TRANSMISSION

FIELD OF THE INVENTION

The present invention relates generally to automatic transmissions, and more particularly to determining a clutch fill volume.

BACKGROUND OF THE INVENTION

An automatic transmission typically includes an electronically controlled hydraulic system. In such an electro-hydraulic system, hydraulically actuated clutches are actuated to couple and decouple gearsets for changing gear ratios of the transmission. Also, a transmission pump supplies pressurized hydraulic fluid from a fluid sump to the clutches through fluid passages. Further, solenoid actuated valves are placed in fluid communication with the fluid passages upstream of the clutches. Finally, a controller receives vehicle input signals, processes the input signals with shift control algorithms to produce solenoid control output signals, and transmits the output signals to the solenoid valves to control flow of fluid to clutch apply cavities of the clutches The vehicle input signals can include transmission input, output, and internal speed sensors, as well as transmission hydraulic pressure switches that change state at preset pressures to indicate pressurization of the fluid passages and associated clutches. Clutch fill volumes are defined at least in part by the clutch apply cavities.

SUMMARY OF THE INVENTION

In one implementation of a presently preferred method for determining a fill volume of a clutch of an automatic transmission, a clutch fill sequence is observed from measurement of fluid pressure applied to the clutch, wherein the sequence may include an initial rise, a plateau, and a final rise. Also, a fill end time is identified as corresponding to an intersection of a forward extrapolated portion of the plateau and a backward extrapolated portion of the final rise.

BRIEF DESCRIPTION OF THE DRAWINGS

The following detailed description of preferred embodiments and best mode will be set forth with reference to the accompanying drawings, in which.

DETAILED DESCRIPTION OF PREFERRED EMBODIMENTS

Figure 1:
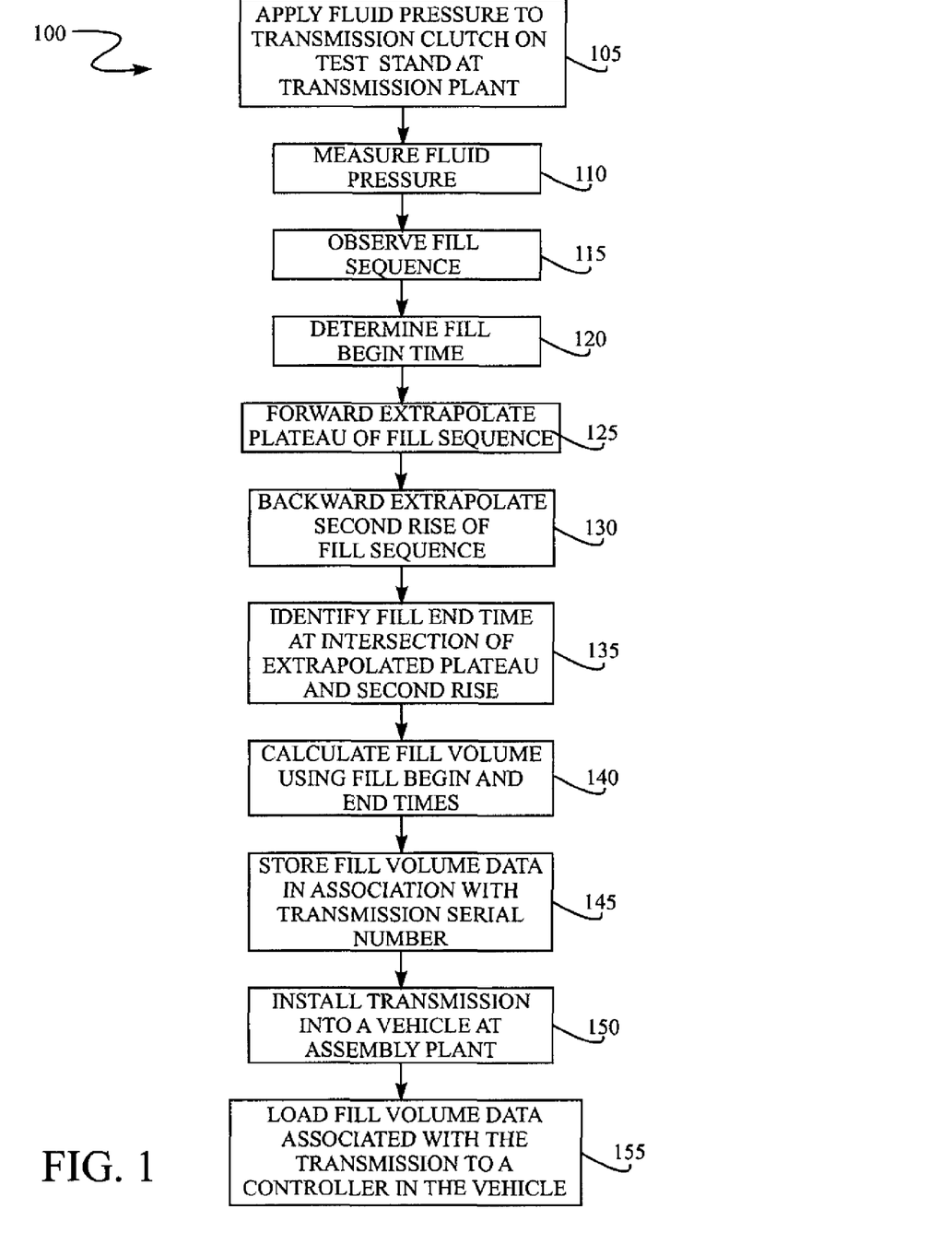
FIG. 1 is a flow chart of an embodiment of a method of manufacturing a vehicle including methods of determining a transmission clutch fill volume.

Referring in more detail to the drawings, FIG. 1 illustrates a method of manufacturing a vehicle having a transmission, including methods of determining a fill volume of a clutch of the transmission. Before discussing the method steps, an exemplary transmission is discussed below.

In general, an automatic transmission includes hydraulically-actuated friction elements connected between other transmission components to selectively couple the components to one another, the engine crankshaft, and/or the transmission case, to achieve various torque ratios. The friction elements are also known as clutches and can include torque converter clutch plates, multi-plate clutch packs, brake bands, and the like, and provide means to apply and release separate components to and from each other during flow of power through the transmission.

Exemplary clutches can be connected between planetary gearsets in the transmission to provide various gear ratios and thus various drive speeds. Such clutches can generally include a housing, a piston, and a clutch apply cavity defined between the housing and one side of the piston. The clutches can also include a plurality of alternating metal plates and friction material disks carried by the housing on another side of the piston. As an example, one set of the plates or disks can be splined to the housing, which can be connected to a carrier of one planetary gearset, while the other set can be splined to a sun gear of another planetary gearset. When the clutch is not pressurized the alternating plates and disks are free to rotate relative to one other. Such clutches can include a low/reverse clutch (LR), an underdrive clutch (UD), kickdown clutch (2-4), an overdrive clutch (OD), a low compounder clutch (LC), a direct compounder clutch (DR), and/or the like.

A solenoid-actuated valve can be used to control flow of pressurized fluid to the clutch apply cavity of the clutch. The flow of pressurized fluid into the clutch apply cavity causes the piston to move into firm engagement with the alternating plates and friction disks, which frictionally engage one another to transmit torque through the clutch. Clutch pressurization is enabled by the opening of the solenoid-actuated valve in response to command or control signals received from an electronic control system.

The electronic control system typically includes a microcomputer-based transmission controller that communicates with the solenoid-actuated valve. The controller can generally be adapted to receive input signals indicative of various vehicle operating conditions such as engine speed, torque converter turbine speed, transmission output shaft speed, engine throttle angle position, brake application, hydraulic pressures, a driver selected gearshift condition (e.g. PRNDL), temperatures, or the like. In particular, the controller can receive hydraulic pressure feedback such as by direct feedback from via pressure switch on/off signals, and/or by expected speed relationships based on signals indicative of clutch application. Using these signals, the controller can execute shift schedules stored in memory to generate output control signals for causing the actuation of the solenoid-actuated valves which regulate the application and release of fluid pressure to and from the apply cavities of the clutches of the transmission.

Shift schedule algorithms include clutch control routines that rely on accurate clutch fill volume data to predict shift events and dynamics and thereby control fluid application to each clutch in order to provide an optimum shift quality or feel. Initially, when a transmission is new, the clutch control routines use nominal clutch fill volumes, which are estimates of clutch fill volumes based on design intent dimensions of components. Subsequently, adaptive clutch control routines incrementally adjust and store the clutch fill volume data over the life of the transmission based on previously empirically determined clutch fill volume trends and current input from system sensors.

But the stored nominal volume may deviate from the actual fill volume. Although each transmission component may be machined to precise predefined dimensions, manufacturing tolerances or build variations often result in components or assemblies having slightly larger or smaller dimensions. These variations can ultimately affect the hydraulic fluid fill volumes of each of the various clutches, or in other words, the volume of fluid that is displaced to effectively apply or engage that clutch. The fill volume can include any or all portions of a hydraulic fluid path that is involved in pressurizing a clutch, such as fluid passages, shift accumulators, or the like.

At step 105, fluid pressure is applied to a transmission clutch in any suitable manner. For example, at a transmission plant, an assembled transmission can be tested on a final test stand. The final test stand generally includes an input motor connected to the transmission torque converter for rotationally powering the transmission, and a brake motor connected to a transmission output shaft for loading the transmission to simulate road load conditions. The test stand may also include a controller, and various electro-hydraulic match plates and connectors coupled to the controller and to various hydraulic circuits and sensors of the transmission. The controller commands the input and brake motors and commands the transmission to undergo gear shifts. The controller also monitors fluid pressures and electrical signals to dynamically check many functions of the transmission. Typical functional checks include verifying correct gear shift points, shift durations, noise, and the like. While the transmission is being final tested, the transmission clutches are applied and released under fluid pressure.

At step 110, the applied fluid pressure from step 105 is measured in any suitable manner. For example, the final test stand can measure clutch fluid pressure via connection to a suitable transmission pressure transducer. Electrical signals indicative of clutch fluid pressure are received by the test stand and can be stored in memory. During final testing of the transmission, the clutches may be applied more than once. The fluid pressure may be measured during any of the clutch applications. But if air is present in the transmission hydraulics, it can compromise algorithms designed to determine clutch volumes. Thus, because such air is typically vented after one or more clutch applications, the fluid pressure measurement step can be carried out for a given clutch during the final test sequence during the last application of the given clutch for a reliable pressure trace for analysis.

Figure 2:
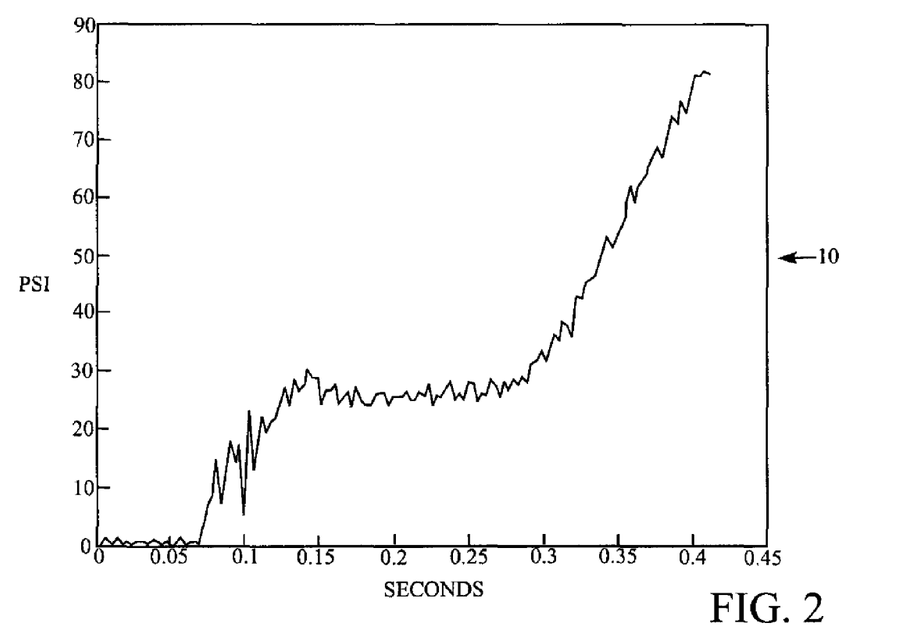
FIG. 2 is a graphical view of raw data from a transmission test stand according to a transmission clutch fill sequence.
Figure 3:
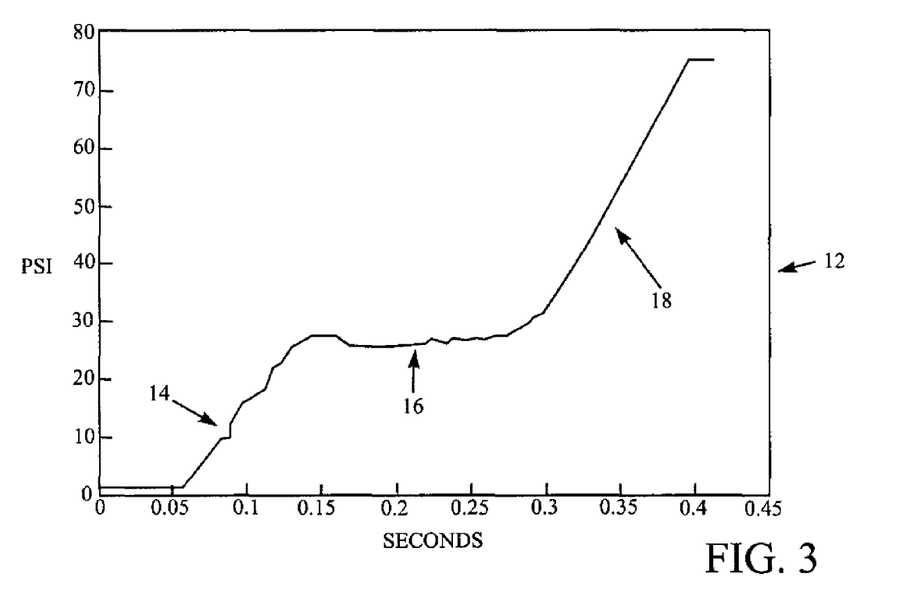
FIG. 3 is a graphical view of smoothed data according to the transmission clutch fill sequence of FIG. 1, illustrating a initial rise, a plateau, and a final rise.

At step 115, a clutch fill sequence is observed from the measured fluid pressure in any suitable manner. For example, as shown in FIG. 2, the clutch fill sequence can be defined in a raw data pressure trace 10, which can be generated by the test stand controller from fluid pressure signals received by the controller from the pressure transducer. The raw pressure trace 10 can be cleaned up with a smoothing operation to better identify relevant portions of the pressure trace clutch fill sequence. For instance, as shown in FIG. 3, a typical clutch fill sequence of a smoothed pressure trace 12 can be defined by at least three regions; an initial fill or rise 14, a fill plateau 16, and a final rise 18. To smooth the raw data, a non-causal window operation can be employed, such as Equation 1 below:

$$p\_sm(i) = \left[ \sum_{k=i-j}^{i+j} p\_raw(k) \right] / (2j+1) \quad (1)$$

where: p_raw=clutch pressure raw data as shown in FIG. 2;
2j+1=width of symmetric smoothing window operation; and
p_sm=smoothed data as shown in FIG. 3.

Additionally, a suitable sample rate can be chosen to account for pressure trace transients. For example, the plateau region may be brief, such as about 0.2 seconds and, therefore, a sampling period of about 3 ms can be used for good data processing reliability. The variable j can be any suitable value that removes sufficient noise components in the pressure signal but that does not generally compromise curve characteristics to a substantial degree. An exemplary a value of j can be about 10.

The smoothed data is then further processed by either a graphical method or a direct method. The graphical or direct methods are used to identify begin and end times of the clutch fill, and to ultimately calculate clutch fill volume. The direct method uses known information about the different clutches in the transmission that can include expected ranges of pressures during the initial rise and the final rise for all clutches. In contrast, the graphical method relies on just the pressure trace itself, without any assumptions or prior known information regarding the pressures or times in the pressure trace. Both methods present valid, accurate solutions to calculating clutch fill volumes and the accuracy of one relative to the other may be determined on a case-by-case basis depending on the particular clutch and transmission involved.

Graphical Method

Figure 4:
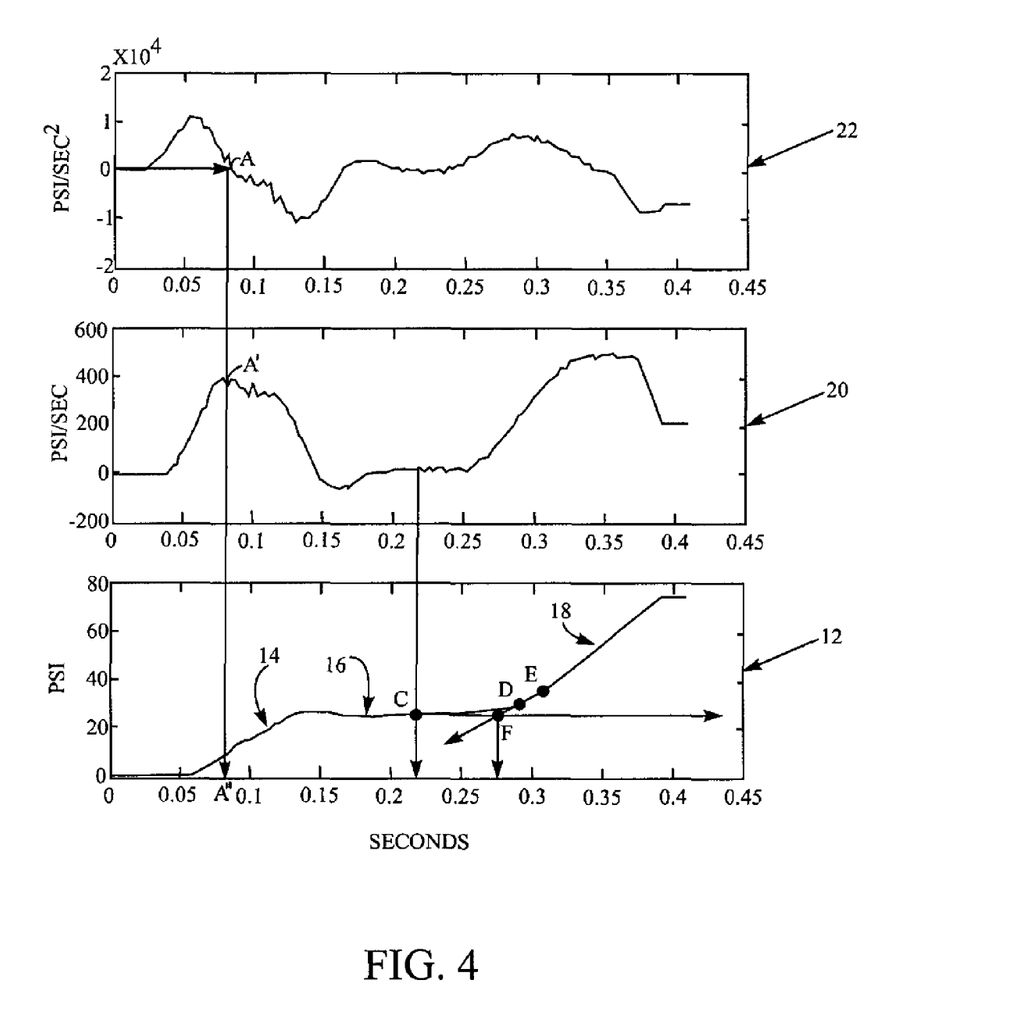
FIG. 4 is a graphical view of the smoothed data of FIG. 3 and smoothed first and second derivative data plots according to the transmission clutch fill sequence of FIG. 1, and illustrating event capture points according to an embodiment of determining a clutch fill volume.

Referring now to FIG. 4, an event capture process is illustrated according to the graphical method. First, a first order derivative can be calculated from the smoothed pressure data. A smoothing operation similar to or according to Equation 1 can be performed on the first order derivative data. A smoothed first order derivative trace 20 is shown above the smoothed pressure trace 12. The smoothed first order derivative trace 20 is shown in pressure/time (PSI/sec) versus time (seconds) and can also be termed "velocity." Second, a second order derivative can be calculated from the smoothed first order derivative data. Again, a smoothing operation similar to or according to Equation 1 can be performed on the second order derivative data. A smoothed second order derivative trace 22 is shown above the smoothed first order derivative trace 20. The smoothed second order derivative trace 22 is shown in pressure/time$^2$ (PSI/sec$^2$) versus time (seconds) and can also be termed "acceleration."

At step 120, a clutch fill begin time is determined. The first inflection point on the smoothed pressure trace 12 is determined by locating the first instance where acceleration crosses zero (point A on the trace 22) and where velocity is positive (point A' on the trace 20). The time value corresponding to points A and A' is shown as point A" and is used as the beginning of the clutch fill time $t_0$.

Figure 5:
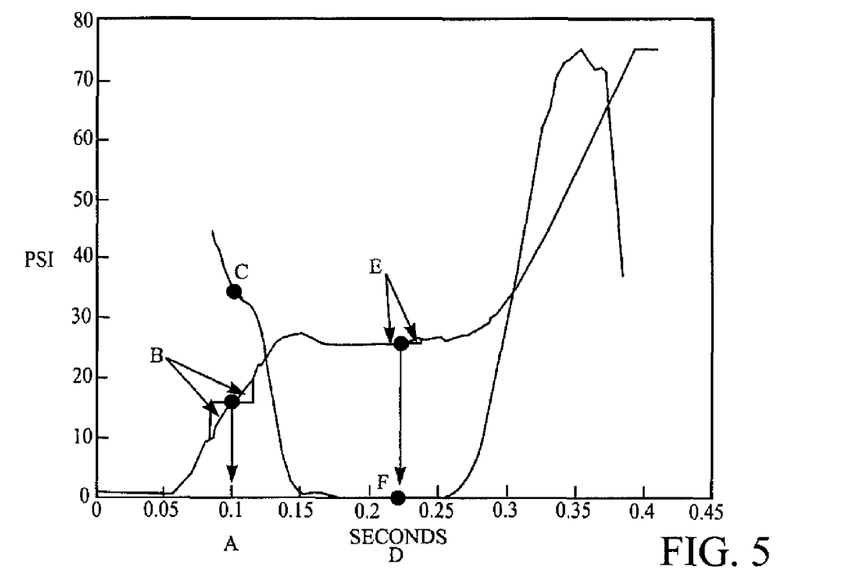
FIG. 5 is a graphical view of the smoothed data of FIG. 3 overlaid with a root mean square trace generated using the smoothed data.

At step 125, the plateau is forward extrapolated in any suitable manner. For example, a representative point of the plateau can be identified and extrapolated forward along a flat line. In a more particular example, a representative point in the clutch fill plateau can be graphically determined using a root mean square (RMS) method, wherein successive areas of the pressure trace are compared with an expected flat line of limited length. The point at which the RMS measurement is at a minimum is considered a point representative of the clutch fill plateau. FIG. 5 illustrates the smoothed pressure trace, overlaid with an RMS trace generated from Equation 2, described below.

Referring to FIG. 5, a point in time along the initial rise is identified, such as at 0.1 sec at point A. Then, a forward search is conducted from point A, wherein the pressure trace 12 is compared against an average of the pressure trace over a given timeframe. For example, Equation 2 can be used as shown below.

$$p\_rms(i) = \sum_{k=i-j}^{i+j} (p\_sm(k) - p\_avg_i)^2 \qquad (2)$$

where: $p\_sm(k)$=smoothed pressure trace data from Equation 1, using a larger value for j; and
$p\_avg_i$=average of pressure trace in timeframe defined by "k".

The RMS of the pressure traces uses Equation 1, but with a much larger value of "j" to provide additional robustness in the search. For example, j can be based on a percentage of the length of the pressure trace in terms of number of samples taken. An exemplary percentage can be 10% of 400 samples and, because j represents half of the examined window, an exemplary value for j would be 20.

As shown in FIG. 5, the time point A corresponds to an RMS point C, which signifies the starting point for a search for a minimum point F along the RMS trace. The search involving Equation 2 is carried out at least partly into the final rise of the pressure trace. For example, the RMS search can end at a point corresponding to about 80% of the maximum of the pressure trace. A minimum point on the RMS trace reliably corresponds to a representative pressure value in the clutch fill plateau region of the pressure trace. For example, the minimum of the entire RMS trace is created by evaluation of regions E, with a corresponding RMS value, point F, and a corresponding time value, point D. Point D of FIG. 5 corresponds to point B of FIG. 4 which is the time at which point C of FIG. 4 occurs—approximately 0.22 seconds.

Thus, referring back to FIG. 4, the representative point on the pressure trace where the RMS is minimum, is point C.

Point C is then extrapolated forward. For example, a line is generated from point C wherein the line is defined by pressure values equal to the pressure value of point C for all time values.

At step 130, the final rise is backward extrapolated. First, the pressure value of point C is multiplied by a suitable factor, such as about 1.2. For example, the pressure trace 12 is referenced to identify a pressure value corresponding to the product of the factor and the pressure value at point C to identify representative point D. Second, the pressure value of point C is multiplied by a larger suitable factor, such as about 1.3. The pressure trace is again referenced to identify a second pressure value, this time one that corresponds to the product of the larger factor and the pressure value of point C to identify representative point E. The factors can be selected independent of maximum pressure and to avoid an unreliable slope of the final rise if the pressure maximizes prematurely. Third, a line is backward extrapolated from point E through point D. For example, a line can be connected between points E and D, the slope of the line calculated, and the line extended back according to an equation of the line using the calculated slope.

At step 135, the clutch fill end time is identified at an intersection F of the forward extrapolated line from the plateau and the backward extrapolated line from the final rise. The time value point G corresponding to the intersection F is the clutch fill end time $t_e$.

At step 140, the clutch fill volume is calculated using the clutch fill begin and end times. Still referring to FIG. 4, point A" and point G represent the clutch begin and end fill times ($t_0$, $t_e$) used in calculating the clutch fill volume. According to the graphical method, a process similar to a Laminar flow model can be used. For example, Equation 3 below can be used to determine the flow rate over time, and an integral of Equation 3 over the clutch fill time interval ($t_0$, $t_e$) can be used to determine the clutch fill volume, according to Equation 4 below. The calculations are carried out specific to the particular clutch involved, such as a particular underdrive (UD) clutch design of a particular transmission design.

$$Q_{UD}(t) \frac{in^3}{sec} = \frac{P(t)\pi D^2}{4\gamma \Delta t} \qquad (3)$$

where: $Q_{UD}$=flow rate for the particular clutch, in$^3$/sec;
$P(t)=p\_sm$=pressure found on the trace, lbf/in$^2$;
$\gamma$=oil specific weight, lbf/in$^3$;
D=restrictor orifice diameter for the particular clutch, in; and
$\Delta t$=sample time interval P(t) and P(t+$\Delta t$), sec.

The temperature of the oil can be recorded for use in determining the oil specific weight for Equation 3. Exemplary Table 1 of oil specific weight as a function of temperature is provided below:

TABLE 1

| | Oil Specific Gravity | | | | | | | | | | | |
|---|---|---|---|---|---|---|---|---|---|---|---|---|
| | °C. | | | | | | | | | | | |
| | −10 | 0 | 10 | 20 | 30 | 40 | 50 | 60 | 70 | 80 | 90 | 100 |
| Oil Specific Weight Water Specific Weight | 0.8595 | 0.8532 | 0.8463 | 0.8395 | 0.8326 | 0.8257 | 0.8188 | 0.8120 | 0.8025 | 0.7923 | 0.7815 | 0.7898 |

The clutch fill volume can be calculated according to Equation 4 below, $$V_{G\_UD} = K_{G\_UD} * \int_{t_0}^{t_e} Q_{UD}(t)\,dt \qquad (4)$$

where: $V_{G\_UD}$=volume of the particular clutch, in$^3$; and
$K_{G\_UD}$=adjustment factor to align graphical method results with empirical data.

For example, those of ordinary skill in the art will recognize that the $K_{G\_UD}$ adjustment factor can be developed by comparing test results on a new transmission from a transmission plant final test stand to test results on the same new transmission installed in an instrumented vehicle. In particular, the $K_{G\_UD}$ adjustment factor can be within a range of 0.9 to 1.1. The results of using Equation 4 for the graphical method and Equation 6 of the direct method, described below, are consistent. But a constant adjustment factor is used to compensate for consistent differences between test stands and in-vehicle environments. Such differences are typically not modeled because such modeling would likely be too resource consuming for use with the presently disclosed methods.

At step 145, the clutch fill volume is stored in memory in association with a serial number of the transmission being tested. For example, the calculated volume can be stored in memory of the test stand controller, a plant computer network memory, a memory of a controller of the transmission, or the like. The volume is stored as data for subsequent use when the transmission is installed in a vehicle.

At step 150, the transmission is installed into a vehicle at a vehicle assembly plant. Vehicle assembly, including transmission installation, is generally known to those skilled in the art. At the assembly plant, the transmission serial number is associated with the vehicle identification number (VIN) during the assembly process.

At step 155, the clutch fill volume data can be loaded to a controller of the vehicle into which the transmission is installed. A VIN and transmission serial number cross-reference index can be used to extract clutch volumes for the transmission and to flash them into or otherwise provide them or make them available to the vehicle's on-board controllers. For example, the volume data can be directly recalled from memory at the transmission plant over an intracompany computer network. In another example, the volume data can first be transferred from memory at the transmission plant to memory at the vehicle assembly plant, and subsequently recalled from vehicle assembly plant memory over a plant computer network. In other words, the clutch fill volume data is the same exact clutch fill volume stored in memory in association with the installed transmission, tracked by the serial number of the transmission being tested. The volumes, as well as the corresponding transmission serial number, can be sent to the assembly plant as an ASCII string. In any case, at least one calculated volume per clutch per transmission could be stored in memory for use at the assembly plant.

There is an assumption of reliable transmission of the clutch fill volume data from the transmission plant to the vehicle assembly plant. But in the case of lost or corrupted data during data transfer or otherwise, suitable software in the vehicle can be provided to retain the ability to perform previously established in-vehicle tests to generate clutch fill volumes, or to use empirical stored baseline clutch fill volumes. Further, a vehicle controller memory can store the type of clutch fill volume calculation method that was used to determine the clutch volumes.

Direct Method

Figure 6:
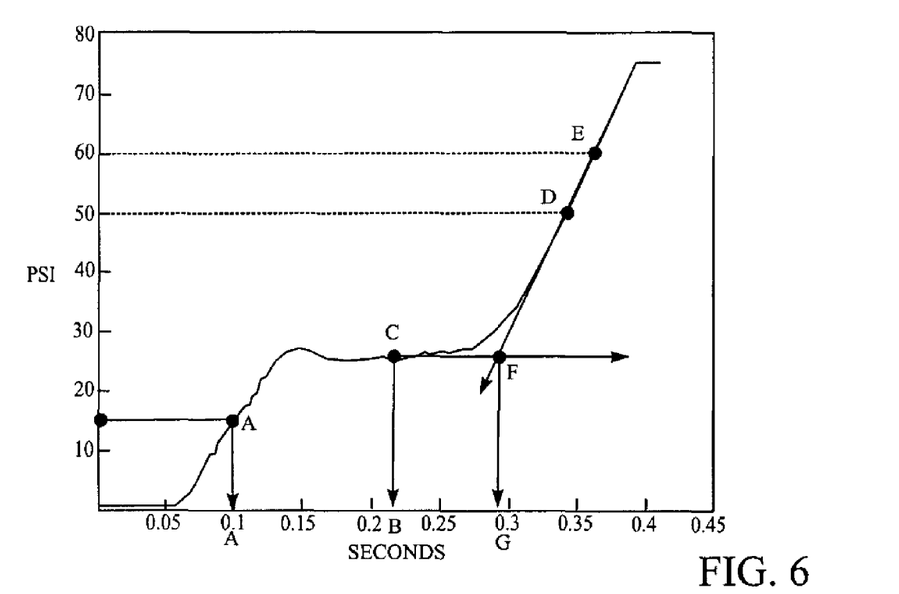
FIG. 6 is a graphical view of smoothed data according to the transmission clutch fill sequence of FIG. 1, illustrating event capture points according to another embodiment of determining a clutch fill volume.

Referring now to FIG. 6, an event capture process is illustrated according to the direct method of determining begin and end fill times and calculating clutch fill volume. The direct method is encompassed by the same general steps of method 100 of FIG. 1. Steps 105-115, 125, 135, and 145-155 may be identical, and steps 120, 130, and 140 may include specific direct method variations on the general method.

At step 120, the begin fill time is determined. For example, an empirically determined pressure value is observed during the initial rise 14 and a corresponding time value is captured and determined to be the begin fill time $t_0$, at point A of FIG. 6. The expected pressure value can be based on empirical testing of clutch fill pressures, and an exemplary expected pressure value can be about 15 PSI.

At step 130, the final rise is backward extrapolated. But according to the direct method, a first empirically determined pressure value is selected, and the final rise is referenced to identify the first pressure value as point D. As one example, the point D pressure value can be an absolute pressure value, such as about 50 PSI, or can be a relative value of maximum pressure, such as about 50%. Second, a second empirically determined pressure value is selected, and the final rise is referenced to identify the second pressure value as point E. As one example, the point E pressure value can be an absolute pressure value, such as about 60 PSI, or can be a relative value of maximum pressure, such as about 60%. The point D and E pressure values can be based on empirical testing of clutch fill pressures, and can be any suitable values. Third, a flat line is backward extrapolated from point E through point D. For example, a line can be connected between points E and D, the slope of the line calculated, and the line extended back according to an equation of the line.

At step 140, the clutch fill volume is calculated using the clutch fill begin and end times. Point A and point G from FIG. 6 represent the clutch begin and end fill times ($t_0$, $t_e$) used in calculating the clutch fill volume. The overall fill time $t_f$ is determined by Equation 5, and is used with a known clutch fill volume flow rate in calculating clutch fill volume according to Equation 6 below.

$$t_f = t_e - t_0 \tag{5}$$

$$V_{D\_UD} = t_f * Q_{UD} * K_{D\_UD} \tag{6}$$

where: $Q_{UD}$=known flow rate, in$^3$/sec;
$V_{D\_UD}$=volume of the clutch, in$^3$; and
$K_{D\_UD}$=adjustment factor to align direct method results with empirical data.

The known flow rate can be determined from in-vehicle or bench testing, wherein the volume of the clutch cavity and the volume occupied by the clutch packs are measured. Governing input and exhaust orifices of the clutch are measured, wherein pressure transducers are placed in-line before and after the orifices. The clutches are hydraulically applied and released repeatedly, and pressure traces and time intervals are measured over a variety of temperatures. Standard fluid mechanic equations based on pressure differences across the orifices are used to determine the flow rates.

Both the direct and the graphical methods can be performed for each clutch within a transmission. Also, two different adjustment factors ($K_D$, $K_G$) can be used per clutch of a given transmission, and each clutch can have individualized adjustment factors. By experimentation, it has been found that one of the direct or graphical methods may yield more reliable results than the other depending on the clutch being evaluated. Accordingly, statistical analyses can be used to determine which method is optimal for a particular clutch type.

With both the graphical and direct methods, error checks can be carried out on the times, volumes, and adjustment factors. For example, an error check can compare begin and end fill times for a particular clutch against empirically determined minimum and maximum fill times for the clutch, Likewise, an error check can compare a calculated clutch fill volume for a particular clutch against empirically determined maximum and minimum volumes for the clutch. Similarly, to ensure the integrity of the adjustment factors as they are used in the transmission final test stands during production, shadow values of the adjustment factors can be used. In other words, upper and lower adjustment factor limits can be set based on statistical analysis of empirical tests. This will guarantee reliable data generation from the test stands and can reduce accidental modifications of the adjustment factors during production.

While certain preferred embodiments have been shown and described, persons of ordinary skill in this art will readily recognize that the preceding description has been set forth in terms of description rather than limitation, and that various modifications and substitutions can be made without departing from the spirit and scope of the invention. The invention is defined by the following claims.

What is claimed is:

1. A method of determining a fill volume of a clutch of an automatic transmission, the method comprising the steps of:
    observing a clutch fill sequence from measurement of fluid pressure applied to the clutch, wherein the sequence includes a initial rise, a plateau, and a final rise;
    identifying a fill end time corresponding to an intersection of a forward extrapolated portion of the plateau and a backward extrapolated portion of the final rise; and
    wherein the identifying the fill end time step comprises the steps of:
        identifying at least one representative point of the plateau;
        forward extrapolating a line from the at least one representative point of the plateau;
        identifying first and second representative points of the final rise; and
        backward extrapolating a line from the first representative point through the second representative point of the final rise.

2. The method of claim 1 further comprising the steps of:
    smoothing a raw data pressure trace of the fluid pressure to yield a smoothed pressure trace according to the following equation:

$$p\_sm(i) = \sum_{k=i-j}^{i+j} p\_raw(k)/(2j+1)$$

where p_raw=clutch pressure raw data;
    2j+1=width of symmetric smoothing window operation; and
    p_sm=smoothed data; and
    using the smoothed pressure trace to observe the clutch fill sequence.

3. The method of claim 1 wherein the step of identifying the at least one representative point of the plateau comprises:
    generating an RMS trace according to the following equation:

$$p\_rms(i) = \sum_{k=i-j}^{i+j} (p\_sm(k) - p\_avg_i)^2;$$

where: p_rms=root mean square pressure;
    p_sm=smoothed data
    p_avg=average pressure in timeframe defined by "k"
    identifying a minimum point on the RMS trace; and
    identifying a point on the plateau that corresponds to the minimum point on the RMS trace.

4. The method of claim 1 wherein the step of identifying first and second point of the final rise comprises multiplying a pressure value corresponding to the at least one representative point of the plateau by first and second factors, and referencing the pressure trace to identify pressure values which are the products of the multiplying step.

5. The method of claim 1 wherein the step of identifying first and second points of the final rise comprises selecting first and second empirically determined pressure values and referencing the final rise of the pressure trace to identify the pressure values.

6. The method of claim 1 further comprising the step of determining a begin fill time in the clutch fill sequence.

7. The method of claim 6 further comprising the step of smoothing a raw data pressure trace of the fluid pressure to yield a smoothed pressure trace and wherein the step of determining the begin fill time comprises generating first and second order derivative traces from the smoothed pressure trace, and identifying a first instance where the second order derivative trace crosses zero and where the first order derivative trace is positive, and using a time value corresponding to the first instance.

8. The method of claim 6 wherein the step of determining the begin fill time comprises observing an empirically determined pressure value during the initial rise and referencing the initial rise to identify a time value corresponding to empirically determined pressure value as the begin fill time.

9. The method of claim 6 further comprising calculating a fill volume using the fill begin and end times.

10. The method of claim 9 further comprising the step of performing an error check on at least one of the begin and end fill times or the fill volume.

11. A method of determining a fill volume of a clutch of an automatic transmission, the method comprising the steps of:
    observing a clutch fill sequence from measurement of fluid pressure applied to the clutch, wherein the sequence includes a initial rise, a plateau, and a final rise;
    identifying a fill end time corresponding to an intersection of a forward extrapolated portion of the plateau and backward extrapolated portion of the final rise;
    determining a begin fill time in the clutch fill sequence;
    calculating a fill volume using the fill begin and end times; and
    wherein the step of calculating the fill volume comprises using the following equations:

$$V_G = \int_{t_0}^{t_e} Q(t)\,dt$$

where: $V_G$=volume of the particular clutch, in$^3$; and $$Q(t)\frac{\text{in}^3}{\text{sec}} = \frac{P(t)\pi D^2}{4\gamma \Delta t}$$

where: Q=flow rate for the particular clutch, in$^3$/sec;
    P(t)=p_sm=pressure found on the trace, lbf/in$^2$;
    γ=oil specific weight, lbf/in$^3$;
    $t_e$=clutch fill end time;
    D=restrictor orifice diameter for the particular clutch, in; and
    Δt=sample time interval P(t) and P(t+Δt), sec.

12. The method of claim 11 wherein the fill volume is further calculated by multiplying $$\int_{t_0}^{t_\beta} Q(t)\,dt$$

by an adjustment factor.

13. The method of claim 11 wherein the step of calculating the fill volume comprises using the following equation:

$$V_D = t_f * Q$$

where: Q=known flow rate, in$^3$/sec;
$V_D$=volume of the clutch, in$^3$; and $$t_f = t_e - t_0$$

where: $t_e$=end fill time; and
$t_0$=begin fill time.

14. The method of claim 13 wherein the fill volume is further calculated by multiplying $t_f*Q$ by an adjustment factor.

15. A method of manufacturing a vehicle having an automatic transmission, comprising the steps of:
applying fluid pressure to a clutch of the automatic transmission;
measuring the fluid pressure; and
determining a fill volume of the clutch including the steps of:
observing a clutch fill sequence from measurement of fluid pressure applied to the clutch, wherein the sequence includes a initial rise, a plateau, and a final rise; and
identifying a fill end time corresponding to an intersection of a forward extrapolated portion of the plateau and a backward extrapolated portion of the final rise; and
wherein the identifying the fill end time step comprises the steps of:
identifying at least one representative point of the plateau;
forward extrapolating a line from the at least one representative point of the plateau;
identifying first and second representative points of five final rise; and
backward extrapolating a line from the first representative point through the second representative point of the final rise.

16. The method of claim 15 further comprising storing the fill volume in association with a serial number of the transmission.

17. The method of claim 16 further comprising installing the transmission into a vehicle.

18. The method of claim 17 further comprising loading the stored fill volume associated with the transmission into a controller of the vehicle, and using the fill volume to control flow of pressurized fluid to the clutch.

19. The method of claim 15 further comprising:
determining a begin fill time in the clutch fill sequence;
calculating a fill volume using the fill begin and end times; and
wherein the step of calculating the fill volume comprises using the following equations:

$$V_G = \int_{t_0}^{t_e} Q(t)\,dt$$

where: $V_G$=volume of the particular clutch, in$^3$; and $$Q(t)\frac{\text{in}^3}{\text{sec}} = \frac{P(t)\pi D^2}{4\gamma \Delta t}$$

where: Q=flow rate for the particular clutch, in$^3$/sec;
P(t)=p_sm=pressure found on the trace, lbf/in$^2$;
$\gamma$=oil specific weight, lbf/in$^3$;
$t_c$=clutch fill end time;
D=restrictor orifice diameter for the particular clutch, in; and
$\Delta t$=sample time interval P(t) and P(t+$\Delta$t), sec.

20. The method of claim 15 further comprising:
smoothing a raw data pressure trace of the fluid pressure to yield a smoothed pressure trace according to the following equation:

$$p\_sm(i) = \sum_{k=i-j}^{i+j} p\_raw(k) / (2j+1)$$

where: p_raw=clutch pressure raw data;
2j+1=width of symmetric smoothing window operation; and
p_sm=smoothed data; and
using the smoothed pressure trace to observe the clutch fill sequence.

* * * * *